Patented Aug. 17, 1948

2,447,017

UNITED STATES PATENT OFFICE

2,447,017

CATALYSTS FOR HYDROCARBON CONVERSIONS

Kenneth K. Kearby, Cranford, N. J., assignor to Standard Oil Development Company, a corporation of Delaware No Drawing. Application October 24, 1947, Serial No. 782,029

6 Claims. (Cl. 252—210)

The present invention relates to improvements in catalysts, and more particularly, it relates to improvements in catalysts useful in reforming naphthas and/or aromatizing aliphatic hydrocarbons.

This application is a continuation-in-part of my copending application Serial No. 521,664, filed February 9, 1944 (now abandoned).

It is known that petroleum naphthas containing appreciable quantities of naphthenes can be subjected to a so-called reforming operation to yield a liquid product of improved octane number boiling in the gasoline range.

Depending on reaction conditions, catalytic reforming operations are generally referred to as either hydroforming or aromatization reactions. By hydroforming is ordinarily meant an operation conducted at elevated temperatures and pressures in the presence of a solid catalyst and added hydrogen, wherein a hydrocarbon fraction is increased in aromaticity and wherein there is no net consumption of hydrogen. The term "aromatization" refers to an operation in which a hydrocarbon fraction is treated at elevated temperatures, but at substantially atmospheric pressure, in the presence of a solid catalyst, for the purpose of increasing the aromaticity of the hydrocarbon fraction.

Catalytic reforming operations are usually carried out at temperatures of around 900°–1000° F. in the presence of such catalysts as molybdenum oxide, chromium oxide, nickel sulfide, or tungsten sulfide, or any of a number of oxides or sulfides of metals of groups IV, V, VI, VII and VIII of the periodic system. These catalysts are usually supported on a base or spacing agent and the most commonly used base is alumina, either of the gel type or precipitated alumina. For example, a modified alumina, made by heat treating hydrated aluminum oxide, has been used as a support or extending agent for the active reforming catalysts mentioned above. Thus, a good catalyst for reforming or hydroforming is one containing about 10% molybdenum oxide supported on an alumina base. However, alumina in its various forms is not heat-stable, particularly at regeneration temperatures which are of the order of 1000–1200° F. At temperatures in the neighborhood of 1100° F. or higher, alumina is definitely impaired by prolonged heating, and this impairment is reflected in the loss of activity of the catalyst composition of which the alumina is the support or spacing agent. Consequently, since the aromatization of a paraffin, such as, for example, normal heptane to form toluene, is an operation which requires high temperatures, the ordinary alumina base does not withstand the temperatures necessary for this particular conversion for a prolonged period of time.

I have found a method of treating alumina to increase its heat resistance so that it may act more efficiently as a support for high temperature catalystic processes, such as reforming and aromatization, and will have a high degree of activity under the most severe temperature conditions for an extended period of time. In my invention the catalyst base or support is prepared by combining aluminum oxide with zinc oxide, preferably in molecular proportions, thereby forming zinc aluminate. This combination forms a true compound of the spinel type and is not merely a mechanical mixture, for I have examined the lattice spacing in accordance with the well known procedure of X-ray diffraction, and as a result of this examination, I shall show hereinafter that the combination is a true chemical compound.

I have found not only that zinc aluminate spinel is more heat stable than ordinary alumina but also that molybdenum oxide and chromium oxide are much more active catalysts when supported on zinc aluminate spinel than when supported on alumina.

While I have pointed out that my catalysts are particularly suitable for use in the aromatization of aliphatic hydrocarbons at high temperatures, I also wish to point out that the researches that I have conducted clearly indicate that my improved catalysts are superior to those formerly used in reforming or hydroforming operations.

The main object of my present invention is to provide a heat-stable base or spacing agent for active reforming and aromatizing catalysts. Another object of my invention is to provide a more active dehydrogenation catalyst especially for aromatizing or hydroforming naphthas, particularly from the standpoint of yields of aromatics in the reformed product.

Another object of my invention is to provide means for synthesizing a heat stable base or spacing agent for active oxide catalysts. A more specific object of my invention is to modify alumina chemically so as to render it more heat-stable and capable of being used at high temperatures as a supporting base for molybdenum oxide and chromium oxide catalysts.

Other and further objects of my invention will appear from the following more detailed description and claims. Briefly, my new catalyst composition comprises a major proportion of a zinc aluminate spinel to which has been added a minor proportion of molybdenum oxide and/or chromium oxide. More specifically my catalyst composition comprises from about 70% to about 95% zinc aluminate spinel and from about 5% to about 30% of chromium oxide or of molybdenum oxide or of mixtures of these oxides. Compositions containing from 10% to 20% of molybdenum oxide or of chromium oxide or of mixtures of these oxides supported on zinc aluminate spinel are particularly effective.

Methods for preparing my new catalyst compositions are set forth below:

EXAMPLE 1

*Solution A.*—974 g. of C. P. zinc nitrate, $Zn(NO_3)_2.6H_2O$, was dissolved in a solution of 179 cc. concentrated nitric acid in 2 liters of distilled water and made up to a volume of 3290 cc.

*Solution B.*—80 g. pure NaOH was dissolved in 4 liters of distilled water. 800 g. of sodium aluminate was stirred in rapidly. After stirring for two minutes, 500 cc. of a diatomaceous earth filter aid was added. Stirring was continued for one-half minute and the suspension was filtered on a Büchner funnel. 3290 cc. of the filtrate was used for solution B. The resulting solution had a concentration of 101 g. $Al_2O_3$ and 87 g. $Na_2O$ per liter. On this basis, the acidity of the zinc nitrate (solution A) was adjusted to exactly neutralize the alkali of the alumina solution.

Solutions A and B were added at equal rates over a period of 30 minutes to 10 liters of distilled water while stirring. Stirring was continued for 15 minutes after all of A and B had been added and the precipitate filtered. The precipitate was washed with 6 liters $H_2O$, restirred in 12 liters of water, filtered and washed with 6 liters $H_2O$. The precipitate was dried and calcined 3 hours at 1000° F.

The zinc aluminate was mixed for 3 hours in the ball mill with a solution of 81.8 g. of C. P. ammonium molybdate dissolved in a mixture of 44 cc. concentrated ammonium hydroxide in 440 cc. $H_2O$. (Additional water was added, sufficient to form a thick paste before mixing.) The mixture was dried, pilled and calcined for 3 hours at 1000° F.

EXAMPLE 2

Another catalyst was prepared as above except that the washed zinc aluminate precipitate was not dried and calcined before mixing with the ammonium molybdate solution.

EXAMPLE 3

Aluminum hydroxide was prepared by adding 1645 cc. of a solution, identical with solution B in Example 1, to 8 liters distilled water and then adding a solution of 295 cc. concentrated nitric acid in 4 liters of distilled water. The precipitate was filtered and washed with 5 liters of distilled water.

409 g. of fused zinc nitrate (32.5% ZnO) was dissolved in 5 liters of water and neutralized by stirring in a solution of 135 g. of sodium hydroxide in 1 liter of water. The precipitate was filtered, washed with 3 liters of distilled water and mixed with 4 liters of distilled water. The filtrate was not clear and was used to resuspend and mix the zinc hydroxide and aluminum hydroxide precipitates. The mixture was filtered and washed on the filter with 3 liters of water. It was mixed for 3 hours in the ball mill, dried and calcined for 3 hours at 1000° F.

The produce was impregnated with ammonium molybdate (40.9 g.) and finished as in Example 1.

The catalyst supports prepared according to the foregoing procedures are true compounds having the formula $ZnO.Al_2O_3$. I have established this by comparison of the X-ray diffraction pattern of my catalyst base with published patterns for zinc aluminate. The comparison is tabulated below:

*Lattice spacings in angstrom units*

| Measured on my Catalyst Base | Standard Literature [3] Values | | |
|---|---|---|---|
| | $ZnAl_2O_4$ | ZnO | Gamma $Al_2O_3$ |
| 2.86 | 2.85 | 2.81 | 2.39 |
| 2.45 | 2.44 | 2.61 | 2.275 |
| 2.02 | 2.02 | 2.46 | [2] 1.975 |
| Blank | [1] 1.91 | Blank | 1.862 |
| 1.652 | 1.65 | 1.61 | 1.52 |
| 1.558 | 1.55 | Blank | [2] 1.396 |
| Blank | [1] 1.48 | 1.47 | 1.139 |
| 1.428 | 1.43 | | .987 |
| 1.278 [1] | Blank | | .882 |
| 1.23 | 1.232 | | .806 |

[1] Weak lines.
[2] Major lines for alumina.
[3] See Ind. and Eng. Chem. Anal. Ed., 10, 510, 511 (1938); and Gamma $Al_2O_3$ from card file of Amer. Soc. for Testing Materials, W. P. Davey, Chairman, Penn., State College.

It will be noted that the catalyst support which I prepared as set forth in the left-hand column compares very favorably with the literature data given for the compound $ZnAl_2O_4$. In columns 3 and 4 I have set forth, respectively, the data given in the literature for zinc oxide and aluminum oxide, and it is clear from these data that my new catalyst support is not a mere mechanical mixture of these two substances, since such a mixture would give superposed patterns of ZnO and $Al_2O_3$. For example, in the aluminum oxide column there are no lines whatever corresponding to the 2.86 or 2.45 Angstrom spacings of my sample, and under the zinc oxide column given in the foregoing table there are blanks corresponding to the 2.02 and 1.652 lines of my sample, and in this same connection at the corresponding points in columns 3 and 4 under zinc oxide and aluminum oxide, the lines differ beyond experimental limits of error (.02 angstrom unit) from those determined by test of my compound. Hence, the compound comprising the base of my new catalyst cannot be a mere mechanical mixture of zinc oxide and aluminum oxide, but is an entirely different crystalline compound.

EXAMPLE 4

To test my new catalysts I made three runs to aromatize normal heptane. These runs were all conducted at 1000° F., at a feed rate of 1.2 volumes of normal heptane per volume of catalyst per hour, at about atmospheric pressure. In run "A" I used 90 parts of my improved base, that is, zinc aluminate spinel, and 10 parts by weight of $MoO_3$; in run "B" I used chromium oxide on alumina, the amount of $Cr_2O_3$ being 11% by weight of the mixture; and in run "C" I used a catalyst consisting of about 10% by weight of molybdenum oxide on alumina. I set forth below the results of these runs:

|  | Run | | |
| --- | --- | --- | --- |
|  | A | B | C |
|  | 90% ZnAl$_2$O$_4$ 10% MoO$_3$ | 11% Cr$_2$O$_3$ on Alumina | 10% MoO$_3$ on Alumina |
| Liquid Recovery, Vol. percent | 70 | 71 | 79 |
| Aromaticity, Vol. percent | 57 | 48 | 30 |
| Total Aromatic Yield, Vol. percent | 40 | 34 | 24 |

It will be noted from the foregoing results that my catalyst gave a 40% volumetric yield of aromatics (mostly toluene), whereas alumina gave with chromium oxide 34%, and with molybdenum oxide 24% aromatics.

EXAMPLE 5

When testing the suitability of my catalyst in aromatization of a naphtha feed, I found that the catalyst was superior to the known reforming catalysts described above. Thus, using a naphthenic feed stock,[1] I made five runs using

[1] The feed had the following inspection: gravity °A. P. I. 55.7; percent S, 0.0058; Br. No.=0; Reid vapor pressure=1.2 lbs./sq. in.; vol. percent aromatics=11.2; vol. percent methyl cyclohexane and ethyl cyclopentane=26.2; vol. percent naphthenes=47.3; vol. percent paraffins=41.5; boiling range=200°-270° F.

my improved catalysts in three and alumina-supported catalysts in two, operating in all five runs at a feed rate of 1.2 volumes of liquid feed per volume of catalyst per hour, at a temperature of 1000° F. and atmospheric pressure (one hour period). I obtained the following results:

|  | Catalyst, Parts by Wt. | | | | |
| --- | --- | --- | --- | --- | --- |
|  | 90% ZnAl$_2$O$_4$, 10% MoO$_3$ | 90% ZnAl$_2$O$_4$, 10% Cr$_2$O$_3$ | 11% Cr$_2$O$_3$ on Alumina | 10% MoO$_3$ on Alumina | 85% ZnAl$_2$O$_4$, 10% MoO$_3$, 5% Cr$_2$O$_3$ |
| Liquid Recovery, Vol. percent | 77 | 80.6 | 81 | 86 | 75.5 |
| Aromaticity, Vol. percent | 71 | 60.2 | 51 | 42 | 77.2 |
| Total Aromatic Yield, Vol. percent | 55 | 48.5 | 41 | 36 | 58.3 |
| Coke, Wt. percent | 6.6 | 4.5 | 4.6 | 4.6 | 6.3 |

It will be noted that here, also, there is a distinct improvement in the aromaticity of the product which is a highly desired result in reforming naphthas because the aromatics improve the octane rating of the gasoline. Hence the gasoline produced by my new catalyst would be superior to that obtained by the conventional process using a conventional catalyst.

EXAMPLE 6

In other runs I have found that by decreasing the naphtha from 1.2 volumes to 0.45 volume of naphtha per volume of catalyst per hour, but otherwise operating under the same conditions, namely, a temperature of 1000° F. and atmospheric pressure, I increased the aromaticity of the product from 71 to 85%. By lowering the temperature to 950° F. even better results were obtained at lower feed rates, namely, at 0.25 volume of liquid naphtha per volume of catalyst per hour. At a feed rate of 0.25 volume of naphtha per volume of catalyst per hour a 69% liquid yield having an aromaticity of 95% was obtained. This represents a gross aromatic yield of 66 volume per cent on feed.

*Influence of feed rate and temperature on the aromatization of naphtha[1] over zinc aluminate-molybdenum oxide catalyst*

|  | V./V./Hr.[2] | | | | | |
| --- | --- | --- | --- | --- | --- | --- |
|  | 0.25 | | 0.45 | | 1.20 | |
| Temperature, °F | 950 | 900 | 950 | 1000 | 950 | 1000 |
| Cycle Length, Hrs | 3 | 3 | 3 | 3 | 1 | 1 |
| Liquid Recovery, Vol. percent | 69 | 84 | 77 | 68 | 84 | 77 |
| Aromaticity, Vol. percent | 95 | 61 | 74 | 85 | 53 | 71 |
| Aromatic Yield,[3] Vol. percent | 66 | 51 | 57 | 57 | 45 | 55 |
| Coke, Wt. percent on Feed | 7.2 | 4.3 | 5.8 | 10.9 | 4.6 | 6.6 |

[1] Feed contains 11% aromatics; naphtha same as described in Example 5.
[2] Volume of liquid feed per volume of catalyst per hour.
[3] Includes aromatics present in feed.

EXAMPLE 7

Other runs were conducted to test the value of my catalyst in hydroforming. In these runs an East Texas naphthenic naphtha (described in Example 5) was treated under conditions set forth below, in one case using my catalyst and in the other run using a conventional hydroforming catalyst consisting of alumina supporting molybdenum oxide, the latter being one of the best hydroforming catalysts heretofore developed. It will be observed in the data presented below that the use of the zinc aluminate molybdenum oxide catalyst gave superior results, for it will be noted that the aromaticity, the gross yield, and the conversions were much higher in the case of the zinc spinel supported catalyst than in the case of the conventional hydroforming catalyst. These data, together with operating conditions, are set forth below:

[4-hour periods; 1.27 v./v./hr. feed rate: 1600 C. F./B[1] of H$_2$; 200 lbs. per sq. in. press.]

|  | Catalyst | |
| --- | --- | --- |
|  | 90% ZnO.Al$_2$O$_3$, 10% MoO$_3$ | 90% Al$_2$O$_3$ 10% M$_0$O$_3$ |
| Temperature, °F | 965 | 956 |
| Liquid Recovery, Vol. Per Cent | 83.4 | 85.5 |
| Gas, Wt. Per Cent | 11.5 | 12.1 |
| Coke, Wt. Per Cent | 0.27 | 0.2 |
| Aromaticity, Vol. Per Cent | 59 | 50 |
| Olefinicity, Vol. Per Cent | 3 | 4 |
| Gross Aromatic Yield, Vol. Per Cent | 50 | 42 |
| Conversion, Vol. Per Cent [2] | 65 | 44 |

[1] Cubic feet per barrel.
[2] Fraction of non-aromatic portion of feed which reacts.

EXAMPLE 8

The effect of pressure in hydroforming is shown by the following data. In each case the feed was a 200°-270° F. naphtha of the type used in Example 5 and the catalyst was 10% molybdenum oxide supported on 90% zinc aluminate. Duration of each run was one hour. It will be seen that in general coke formation is reduced as the pressure is increased and aromatic yields are improved as the pressure is reduced.

*Effect of pressure in hydroforming using zinc aluminate-molybdenum oxide catalyst*

| | | | | |
|---|---|---|---|---|
| Pressure, Lb./Sq. In. Gauge | 0 | 50 | 100 | 300 |
| Temperature, °F | 970 | 971 | 973 | 951 |
| Feed Rate, v./v./Hr | 0.45 | 0.44 | 0.45 | 0.49 |
| Hydrogen Feed, Cu. Ft./Bbl | 1642 | 1629 | 1537 | 1622 |
| Liquid Recovery, Vol. Per Cent | 80.6 | 77.2 | 77.9 | 76.1 |
| Aromatics, Vol. Per Cent | 67 | 66 | 63 | 55 |
| Olefins, Vol. Per Cent | 1.5 | 1.0 | 0.5 | 0 |
| Coke, Wt. Per Cent | 5.1 | 4.9 | 2.1 | 1.6 |

EXAMPLE 9

The following runs show that when aromatizing naphtha at atmospheric pressure dilution of the feed with hydrogen has a marked effect in reducing coke formation and also results in a slightly higher yield of aromatics at a given liquid recovery. Thus, at 950° F., 0.25 v./v./hr., dilution of the vaporized feed with two volumes of hydrogen (2 volumes hydrogen S. T. P. per calculated volume S. T. P. of feed) decreases coke formation from 7.2% to 3.7%, and results in an increase in liquid recovery from 69% to 72%, at about 95% aromaticity. A further reduction in coke formation to 2.5 wt. per cent on feed is obtained by increasing the hydrogen dilution ratio to 4/1. A similar trend is observed at 1000° F., 1.2 v./v./hr. These data are summarized in the following table:

*Influence of hydrogen dilution on the aromatization of naphtha[1] over (90%) zinc aluminate—(10%) molybdenum oxide catalyst*

| | | | | | | |
|---|---|---|---|---|---|---|
| Temperature, °F | 950 | 950 | 950 | 1000 | 1000 | 1000 |
| Feed Rate, v./v./Hr | 0.25 | | | 1.2 | | |
| H₂ Dilution Ratio | 0 | 2/1 | 4/1 | 0 | 2/1 | 4/1 |
| Liquid Recovery, Vol. Per cent | 69 | 72 | 72 | 76 | 82 | 76 |
| Aromaticity, Vol. Per cent | 95 | 94 | 95 | 69 | 62 | 65 |
| AromaticYield (Gross)Vol.Per cent | 66 | 68 | 69 | 52 | 51 | 49 |
| Coke, Wt. Per cent on Feed | 7.2 | 3.7 | 2.5 | 5.3 | 2.4 | 2.2 |

[1] Same naphtha as described in Example 5.

Since the gaseous reaction products are largely hydrogen, it would appear that recycle of a portion of the make gas would be an effective way to reduce carbon formation.

EXAMPLE 10

Further runs were made to test the suitability of my catalyst compositions in reforming naphtha at various temperatures and feed rates and these data are summarized below:

washed therefrom with water. The presence of sulfate in the zinc aluminate spinel is undesirable. For example, I have found that when the zinc aluminate spinel base contained 6.1 per cent SO₄ by weight and was employed to aromatize normal heptane under conventional testing conditions, 44 per cent aromatics, based on feed, was formed. On the other hand, when the same base, tested under identical conditions in aromatizing normal heptane, contained 12 per cent by weight SO₄, the yield of aromatics was only 31 per cent based on feed. While it is possible to reduce this sulfate content by washing with alkaline solutions or by treating the catalyst at elevated temperatures with hydrogen and steam, these procedures are less preferable than using direct methods of preparing catalysts having a low content of sulfate.

The methods outlined below for the preparation of zinc aluminate from zinc sulfate can also be applied to the preparation of this material from zinc chloride, since here also the problem of reducing the occlusion of anions without favoring the occlusion of sodium is encountered. Two methods of preparing the zinc aluminate spinel from zinc sulfate are as follows:

EXAMPLE 11

1416 g. of C. P. zinc sulfate and 105 cc. of concentrated sulfuric acid were dissolved in water to make 5049 cc. of solution A. 1200 g. of sodium aluminate was stirred for 10 minutes in 6000 cc. of water. One liter of filter aid was added and the solution was filtered. 5049 cc. of filtrate was taken as solution B. Five liters of water was stirred vigorously in a 5-gallon crock while solutions A and B were added simultaneously and at the same rate over a 30-minute period. More water was added during the precipitation to facilitate stirring. After the final slurry had been stirred 10 minutes the pH of the supernatant liquid was found to be 10.

The slurry was filtered and the cake was washed with 18 liters of distilled water. It was restirred with distilled water and divided into thirds. Two thirds was set aside for other tests. The other third was slurried in 6 liters of distilled water, filtered and washed with 6 liters of distilled water. The cake was reslurried in 6 liters of distilled water, filtered and washed with 8 liters of distilled water. The cake was made into a thick

*Catalytic aromatization of naphtha[1] over 90% zinc aluminate—10% molybdenum oxide catalyst AT ATMOSPHERIC PRESSURE*

| | | | | | | | | | | | | | | |
|---|---|---|---|---|---|---|---|---|---|---|---|---|---|---|
| Temperature, °F | 900 | 900 | 950 | 950 | 950 | 950 | 950 | 950 | 1000 | 1000 | 1000 | 1000 | 1000 | 1000 |
| Feed Rate, v./v. Hr | 0.48 | 0.45 | 1.2 | 0.45 | 0.25 | 0.26 | 0.25 | 0.25 | 0.48 | 1.2 | 1.2 | 1.2 | 1.2 | 1.2 |
| Cycle Length, Hrs | 3 | 3 | 1 | 3 | 3 | 6 | 3 | 3 | 3 | 1 | 1 | 1 | 1 | 1 |
| H₂ Dilution Ratio | 0 | 2.1 | 0 | 0 | 2.0 | 0 | 0 | 4.2 | 0 | 0 | 0 | 0 | 1.8 | 4.2 |
| Liquid Recovery, Vol. percent | 84.4 | 81.5 | 84.3 | 77.3 | 82.0 | 73.2 | 68.8 | 72.4 | 67.7 | 76.0 | 77.5 | 80.3 | 82.3 | 76.3 |
| Aromaticity, Vol. percent | 61 | 61 | 55 | 74 | 73 | 93 | 95 | 95 | 85 | 69 | 61 | 68 | 62 | 65 |
| Aromatic Yield, Vol. percent | 51 | 49 | 45 | 57 | 60 | 68 | 66 | 69 | 57 | 52 | 47 | 55 | 51 | 49 |
| Coke, Wt. percent on Feed | 4.3 | 2.0 | 4.6 | 5.8 | 3.3 | 5.9 | 7.2 | 2.5 | 10.9 | 5.3 | 7.2 | 6.7 | 2.4 | 2.2 |
| Gas, Wt. percent on Feed | 6.8 | 9.8 | 6.6 | 10.6 | 7.0 | 11.4 | 4.0 | 15.0 | 13.3 | 12.5 | 8.9 | 7.8 | 9.6 | 13.2 |
| Catalyst Age, Cycles[2] | 9 | 11 | 6 | 7 | 10 | 3 | 1 | 3 | 2 | 0 | 4 | 8 | 5 | 4 |
| Run No | 176 | 179 | 176 | 176 | 179 | 184 | 188 | 188 | 184 | 184 | 164 | 176 | 164 | 188 |

[1] Naphtha same as used in Example 5.
[2] A cycle is a period on-stream and a period of regeneration with a mixture of air and inert gas (usually 2 hours).

In the foregoing examples the zinc aluminate base was prepared using zinc nitrate as starting material. It is also possible to prepare zinc aluminate from zinc sulfate as starting material but in this case certain precautions must be observed. One of the problems is that when the zinc aluminate is precipitated from a solution of zinc sulfate and a soluble aluminum compound, SO₄ radical is occluded in the precipitate and cannot be paste with distilled water and was mixed with a solution of 40.9 g. ammonium molybdate in a blend of 25 cc. concentrated ammonium hydroxide plus 250 cc. of distilled water. This gave a composition of 90 parts by weight of ZnAl₂O₄ and 10 parts by weight of NoO₃. The mixture was ball milled 3 hours, dried with stirring, calcined 3 hours at 1200° F. and pilled. It was tested as a catalyst and gave the following results:

*Catalytic aromatization*

[1000° F.; 1.2 v./v./hr.; 1 hr. periods: 1 atm. pressure]

| | Per cent Conversion | Per cent Selectivity to Aromatics | Vol. per cent Net Aromatics | Gas | Coke |
|---|---|---|---|---|---|
| n-Heptane Feed | 80 | 55 | 44 | 16.5 | 5.9 |
| 200–270° F. East Texas Naphtha Feed | 85 | 53 | 45 | 10.8 | 8.7 |

EXAMPLE 12

In this example the $ZnO.Al_2O_3$ was prepared on the basis of giving 25 pounds of finished catalyst. The amount of sodium aluminate solution required when made by the standard procedure described below was calculated to be 57.3 liters. From the alumina and sodium hydroxide content of this solution the required amounts of zinc sulfate and sulfuric acid were calculated.

Thirty-five and thirty one-hundredths pounds of technical zinc sulfate and 986 cc. of concentrated sulfuric acid were dissolved in water to give 57.3 liters of solution A. Thirteen kilograms of sodium aluminate was stirred for 15 minutes in 65 liters of water. About 6 liters of filter aid was stirred in and the mixture was filtered with a filter crock. Fifty-seven and three tenths liters of the filtrate was taken as solution B.

Twelve liters of water was poured into a 50-gallon barrel and stirred vigorously while solutions A and B were added simultaneously and at the same rate from calibrated bottles during a period of one hour.

The pH of the liquid portion of the slurry was found to be 12. Portions of sulfuric acid diluted 20 to 1 were added with stirring until the pH was reduced to 7.5. (Three hundred and fifty cc. of concentrated sulfuric acid diluted with 7 liters of water was added in all.)

The slurry was then pumped into a filter press containing ten plates, 1" by 18" by 18". At a pressure of 65 pounds per square inch only about seven-eighths of the slurry could be pumped into the press. The material in the press was washed with 60 gallons of water per hour for 3 hours. It was then air blown for 30 minutes and dumped. The cake was resuspended in water in a 50 gallon barrel and left overnight. The next morning the slurry was again pumped into the ten-plate press. This time the press was not filled, indicating shrinkage of the precipitate. The press was washed with water at the rate of 150 gallons per hour for 3½ hours. It was then air blown for half an hour and dumped.

The cake was worked into a very thick paste by means of large propeller-type stirrers. The water added in this step was kept to a minimum. A solution of 1220 g. of C. P. ammonium molybdate dissolved in 9 liters of water was then stirred into the paste to form a thick slurry which was allowed to stand overnight. The slurry was then dried in an oven with air circulation at 240 to 400° F. The wet material was stirred occasionally to insure uniformity. The dried product was calcined 3 hours in an electric muffle at 1200° F. and then pilled.

NOTE.—The pH's given above were determined with a commercially available testing paper. Checks with a glass electrode pH meter have indicated that the paper values of 12 to 13 correspond to glass electrode values of approximately 10.5 to 12 and a paper value of 7.5 gives an electrode value of 8.5.

When tested as a catalyst, the following results were obtained:

*Catalytic aromatization*

[1000° F.; 1.2 v./v./hr.; 1 hr. periods: 1 atm. pressure]

| | Per Cent Conversion | Per Cent Selectivity to Aromatics | Vol. Per Cent Net Aromatics | Gas | Coke |
|---|---|---|---|---|---|
| n-Heptane Feed | 77 | 55 | 42 | 14.0 | 5.1 |
| 200–270° F. East Texas Naphtha Feed | 78 | 54 | 42 | 9.3 | 7.5 |

In the preceding examples care was taken to maintain the pH of the solution from which the precipitate was formed at about 9 to 12. At the end of the precipitation the pH was adjusted to a value of within the range of from 7 to 8. By thus proceeding, namely, by limiting the pH during the precipitation within the range of from 9 to 12, the quantity of sulfate radical occluded in the precipitate is restricted to an amount not exceeding 5 per cent by weight. At the same time, by adjusting the final pH of the filtrate to a value between 7 and 8, the sodium was desorbed in the final precipitate so that it did not exceed about one-tenth of 1 per cent and thus was assured the production of catalysts of reproducible activity.

In the two preceding examples are disclosed methods of forming the zinc aluminate spinel base in which I mixed two solutions, zinc sulfate containing sulfuric acid and sodium aluminate containing sodium hydroxide. Instead of so proceeding, I may mix a solution containing zinc sulfate and aluminum sulfate with an alkali such as sodium hydroxide. It will be understood, however, that in these modifications the same precautions must be observed as regards the pH of the supernatant liquid in the precipitating medium, including the final adjustment thereof.

Instead of using a commercial sodium aluminate, I may use an aluminum oxide, such as $Al_2O_3.3H_2O$ dissolved in an alkaline solution.

In any of the methods of preparing zinc aluminate, whether from zinc sulfate, nitrate or other salt, it is to be understood that I may use sodium carbonate in place of sodium hydroxide as precipitating agent. Also by conducting the precipitation at 60–100° C. rather than at room temperature catalyst bases of lower density and increased pore size may be prepared.

As previously indicated, the zinc aluminate composition prepared from the zinc sulfate is more heat stable than the zinc aluminate composition prepared from zinc nitrate as is shown by the following data:

*Catalytic aromatization*

[1000° F.; 1.2 v./v./hr.]

| Calcination | 3 Hrs. in Muffle at 1200° F. | | 6 Hrs. in Stream of Dry $N_2$ at 1400° F. | |
|---|---|---|---|---|
| Zinc Salt Used in Prep. of Cat. Base | Nitrate | Sulfate | Nitrate | Sulfate |
| Vol. Percent Net Aromatics: | | | | |
| n-Heptane Feed | 45 | 42 | 36 | 40 |
| East Texas Virgin Naphtha Feed | 42 | 42 | 32 | 39 |

This is important because in preparing the catalyst the material is calcined ordinarily in a kiln and the more heat stable catalyst does not require the critical control that the less heat stable catalyst requires; and, furthermore, in the regeneration of the catalyst after use in, say, hydroforming or aromatizing operations, the more heat stable catalyst is less liable to injury during regeneration, an operation usually performed by burning off the contaminants formed on the catalyst during use in the on-stream operation.

Another advantage of the catalyst prepared from the zinc sulfate is that of increased activity as set below in the following data:

Catalytic aromatization

[1000° F.; 1.2 v./v./hr.; 1 hr. period]

|  | n-Heptane Feed | |
|---|---|---|
|  | Run #1 | Run #2 |
| Vol. Percent Conversion | 90 | 90.1 |
| Vol. Percent Selectivity | 56 | 56 |
| Vol. Percent Net Aromatics | 51 | 51 |
| Wt. Percent Gas | 18.9 | 18.9 |
| Wt. Percent Coke | 5.4 | 5.1 |

|  | East Texas Naphtha Feed | |
|---|---|---|
|  | Run #3 | Run #4 |
| Vol. Percent Conversion | 88 | 91 |
| Vol. Percent Selectivity | 55 | 55 |
| Vol. Percent Net Aromatics | 48 | 50 |
| Wt. Percent Gas | 13.0 | 12.2 |
| Wt. Percent Coke | 7.0 | 7.8 |

These results are higher than ever obtained from the same type of catalysts tested under similar conditions but in which the catalyst base was zinc aluminate that had been prepared from zinc nitrate.

In the runs set forth in the two preceding tables, the pressure in the reaction zone was approximately 1 atmosphere and no added hydrogen was present in the reaction zone.

Instead of coprecipitating the zinc and the alumina, I may separately precipitate zinc hydroxide and aluminum hydroxide from any suitable source and thereafter mix the precipitates in suitable proportions to form the zinc aluminate. The mixture is then dried and finally calcined at above 800° F. and preferably at above 1000° F. Addition of molybdenum oxide and/or chromium oxide may be successfully accomplished either before or after the drying process. For example, molybdenum oxide may be coprecipitated from a solution of an alkaline molybdate either at the same time the zinc aluminate is precipitated or at some later point in the preparation of the zinc aluminate.

Alternative methods of preparing zinc aluminate include: reaction of sodium zincate or of ammonium zincate with aluminum sulfate or nitrate; admixture of sodium aluminate and sodium or ammonium zincate and coprecipitation with sulfuric or nitric acid; and precipitation of admixed sodium aluminate and sodium or ammonium zincate with zinc and aluminum sulfates or nitrates. Still another method is to convert zinc and aluminum chlorides into zinc and aluminum oxide gels by reaction with ethylene oxide. Also, zinc and aluminum or their alloys may be converted to sols by action of dilute formic or acetic acid in the presence of mercury salts.

When using any of the methods given herein for the preparation of zinc aluminate it may be found advantageous to modify the gelatinous nature of the product by conducting the preparation in the presence of 1 to 10% (based on the dry catalyst) of an acetate, tartrate or citrate, e. g., ammonium acetate, or of 0.5% to 5% of a silicic acid sol or of glycerol, starch, vegetable gums, and the like.

To review briefly, I have found that when alumina is modified by reacting it with a zinc compound to form a complex compound containing the zinc, in other words, zinc aluminate, the resulting product is more heat stable than aluminum oxide. Furthermore, the activity of molybdenum oxide and chromium oxide catalysts is greater when using zinc aluminate rather than alumina as the base or support. My improved base makes it possible to obtain good yields of aromatics by aromatization of paraffins and it also improves the hydroforming process, since it results in the formation of increased quantities of aromatics in the product which is a highly desirable result since these aromatics increase the octane rating of the said product. I have tried a number of other heavy metal divalent oxides as substitutes for zinc oxide without securing any definite improvement in the alumina base.

This is illustrated in the table presented below. These data were obtained in aromatization tests conducted by the method employed in Example 4. All these tests were run at 1000° F. using a feed rate of 1.2 volumes of normal heptane per volume of catalyst per hour at about atmospheric pressure. The catalyst in each case consisted of 10% molybdenum oxide supported on the catalyst base indicated.

Aromatization of n-heptane

[1000° F.; 1.2 v./v./hr.; 1 hr. periods]

| Catalyst | Aromatic Yield, Vol. Per Cent |
|---|---|
| 10% $MoO_3$ on 90% of— |  |
| $Al_2O_3$ | 24 |
| $ZnAl_2O_4$ | 40 |
| $MgAl_2O_4$ | 23 |
| $CdAl_2O_4$ | 19 |
| $CuAl_2O_4$ | 22 |
| $CaAl_2O_4$ | 0 |
| $BeAl_2O_4$ | 4 |
| $MnAl_2O_4$ | 18 |

It will be seen that whereas zinc aluminate spinel was much better than alumina as a catalyst support all of the other metal aluminates were no better than or inferior to alumina.

Although I may use from 5 to 30% of molybdenum oxide or of chromium oxide or of mixtures of these oxides in my catalyst compositions, I have found that from about 10% to about 20% of these oxides is particularly desirable. The effect of varying the molybdenum oxide content of my zinc aluminate-molybdenum oxide catalyst composition is shown in the following table of data obtained under aromatization conditions, that is, at atmospheric pressure and with no added hydrogen.

Effect of $MoO_3$ content on catalyst activity

[1000° F., 1.2 v./v./hr. feed rate, 1 hr. periods]

| | | | | | |
|---|---|---|---|---|---|
| Percent $ZnAl_2O_4$ | 100 | 95 | 90 | 80 | 70 |
| Percent $MoO_3$ | 0 | 5 | 10 | 20 | 30 |
| n-Heptane | | | | | |
| Vol. percent Net Aromatics | 18 | 30 | 40 | 47 | 37 |
| Wt. percent Gas | 13 | 13.4 | 15.2 | 17.1 | 14.7 |
| Wt. percent Coke | 4.5 | 4.1 | 5.1 | 4 | 7.1 |
| 200–270° F. Naphtha | | | | | |
| Vol. percent Net Aromatics | 20 | 34 | 44 | 40 | 35 |
| Wt. percent Gas | 6.8 | 7.8 | 9.2 | 9.8 | 8.9 |
| Wt. percent Coke | 5.1 | 4.2 | 6.6 | 7.7 | 7.5 |

It is to be understood that my new catalysts may be used in a number of reactions other than those disclosed specifically above. For instance, they may be used in the dehydrogenation of paraffins to olefins or of olefins to diolefins, desulfurization of sour petroleum oils, oxidations, destructive hydrogenation of petroleum oil, coal tar oil, coal, etc.

Although it is preferable that my catalyst base be prepared by combining aluminum oxide and zinc oxide in molecular proportions, slight excesses of either component are not harmful. Thus I may use an excess of either reactant in making the zinc spinel or I may admix a slight excess of either ZnO or $Al_2O_3$ with the zinc spinel. Furthermore, I have found that addition of small percentages of promoters is sometimes beneficial, for example, 0.1 to 0.5% of Ni or Pt. Addition of 0.5 to 5% of calcium oxide to my catalyst compositions may be made when it is desired to improve the resistance of molybdenum oxide to oxidation and reduction.

My catalyst may be formed into pills, pellets, or other shaped bodies either before or after the calcination and with or withou the use of pilling aids, such as graphite, starch, solid hydrogenated vegetable fat, etc. The pellets and other shaped bodies may also be formed by extrusion methods. One good method of forming the catalysts into desired shapes is to dry the precipitate in a high humidity atmosphere. For example, a one-inch filter cake can in this way be dried into granules, 90 per cent of which will have a particle size of 2 to 8 mesh. This method of forming the catalyst into desired shapes is important for the reason that it is much less expensive than when the catalyst is formed into pills using pilling machinery.

Of course, in the case where the catalyst is to be used in what is known as a "fluid" catalyst system, it may be ground either before or after calcination to a size range smaller than 500 microns, preferably within the range of 20 to 200 microns. The dried or calcined material from this grinding operation which is too fine to use may be mixed with wet catalyst in order to agglomerate it into a usable coarse size range.

It will be understood that my catalyst, after use in aromatization operations or during hydroforming, and having become contaminated with carbonaceous deposits, may be regenerated by burning off the carbonaceous deposits by treatment with an oxygen-containing gas. This regeneration may be accomplished in a normal manner, conventional in the art except that my catalysts are more heat stable than the ordinary hydroforming catalysts such as those oxides which are supported on an alumina base.

Numerous modifications of my invention falling within the scope thereof may be made by those familiar with this art.

What is claimed is:

1. A catalyst composition consisting of at least 70% of zinc aluminate spinel supporting at least one metal oxide selected from the group consisting of molybdenum oxide and chromium oxide.

2. A catalyst composition comprising from about 70% to about 95% zinc aluminate spinel and from about 5% to about 30% of molybdenum oxide.

3. A catalyst composition consisting of from about 80% to about 90% of zinc aluminate and from about 10% to about 20% of molybdenum oxide.

4. A catalyst composition consisting of about 90% zinc aluminate and about 10% chromium oxide.

5. A catalyst composition consisting of about 90% zinc aluminate and about 10% molybdenum oxide.

6. A catalyst composition consisting of about 85% zinc aluminate, about 10% molybdenum oxide and about 5% chromium oxide.

KENNETH K. KEARBY.

REFERENCES CITED

The following references are of record in the file of this patent:

UNITED STATES PATENTS

| Number | Name | Date |
|---|---|---|
| 2,261,159 | Huppke | Nov. 4, 1941 |
| 2,265,641 | Grosskinsky et al. | Dec. 9, 1941 |
| 2,279,198 | Huppke | Apr. 7, 1942 |
| 2,344,330 | Sturgeon | Mar. 14, 1944 |
| 2,371,087 | Webb et al. | Mar. 6, 1945 |

OTHER REFERENCES

Mellor: Comprehensive Treatise on Inorganic and Theoretical Chemistry, Longmans, Green & Co., 1924, vol. 5, pages 296–297.